United States Patent
Jain et al.

(10) Patent No.: US 11,916,879 B2
(45) Date of Patent: Feb. 27, 2024

(54) PERFORMING FIREWALL OPERATIONS BY SHARING METADATA BETWEEN FIREWALL PROCESSES

(71) Applicant: VMware LLC, Palo Alto, CA (US)

(72) Inventors: Manish Jain, San Jose, CA (US); Mani Kancherla, Cupertino, CA (US)

(73) Assignee: VMware LLC, Palo Alto, CA (US)

( * ) Notice: Subject to any disclaimer, the term of this patent is extended or adjusted under 35 U.S.C. 154(b) by 31 days.

(21) Appl. No.: 17/567,823

(22) Filed: Jan. 3, 2022

(65) Prior Publication Data
US 2023/0216829 A1   Jul. 6, 2023

(51) Int. Cl.
*H04L 9/40* (2022.01)

(52) U.S. Cl.
CPC ...... *H04L 63/0245* (2013.01); *H04L 63/0263* (2013.01); *H04L 63/0428* (2013.01); *H04L 63/166* (2013.01); *H04L 63/20* (2013.01)

(58) Field of Classification Search
CPC ..... H04L 63/0227; H04L 63/02; H04L 63/20; H04L 63/029; H04L 63/0485; H04L 63/0245
See application file for complete search history.

(56) References Cited

U.S. PATENT DOCUMENTS

| | | | |
|---|---|---|---|
| 10,652,281 B1 * | 5/2020 | Moolenaar | H04L 63/0236 |
| 2008/0271134 A1 * | 10/2008 | Johnson | H04L 63/0485 726/13 |
| 2013/0007239 A1 * | 1/2013 | Agarwal | H04L 63/02 709/223 |

(Continued)

OTHER PUBLICATIONS

D. Scholz, D. Raumer, P. Emmerich, A. Kurtz, K. Lesiak and G. Carle, "Performance Implications of Packet Filtering with Linux eBPF," 2018 30th International Teletraffic Congress (ITC 30), Vienna, Austria, 2018, pp. 209-217, doi: 10.1109/ITC30.2018. 00039. (Year: 2018).*

*Primary Examiner* — Michael Simitoski
(74) *Attorney, Agent, or Firm* — Quarles & Brady LLP

(57) ABSTRACT

Some embodiments of the invention provide a novel method for performing firewall operations on a computer. The method of some embodiments instantiates first and second firewall processes on the computer. These two processes are two separate processes, which in some embodiments have separate memory allocations in the memory system of the computer. The method uses the first firewall process to examine a data message to determine whether an encryption based firewall policy (e.g., a TLS-based firewall policy) has to be enforced on the data message. Based on a determination that the encryption-based firewall policy has to be enforced on the data message, the method provides metadata, which is produced by the first firewall process in its examination of the data message, to the second firewall process. The second firewall process then uses the provided metadata to perform an encryption-based firewall operation based on the encryption-based firewall policy. In some embodiments, the data message is encrypted, the first firewall process cannot decrypt the data message, and the second firewall process performs a decryption operation (e.g., a TLS-based decryption operation) to decrypt the data message.

18 Claims, 5 Drawing Sheets

(56) References Cited

U.S. PATENT DOCUMENTS

| | | | |
|---|---|---|---|
| 2014/0282843 A1* | 9/2014 | Buruganahalli | H04L 63/0428 |
| | | | 726/1 |
| 2016/0226967 A1* | 8/2016 | Zhang | H04L 41/122 |
| 2016/0359807 A1* | 12/2016 | Buruganahalli | H04L 63/1408 |
| 2018/0234388 A1* | 8/2018 | Reddy | H04L 63/061 |
| 2019/0173841 A1* | 6/2019 | Wang | G06F 9/5083 |
| 2022/0006804 A1* | 1/2022 | Sivaraman | H04W 12/037 |
| 2022/0353240 A1* | 11/2022 | McDowall | H04L 63/02 |
| 2023/0028837 A1* | 1/2023 | Wang | H04L 41/0897 |
| 2023/0097734 A1* | 3/2023 | Parla | H04L 63/0236 |
| | | | 713/151 |

* cited by examiner

PERFORMING FIREWALL OPERATIONS BY SHARING METADATA BETWEEN FIREWALL PROCESSES

BACKGROUND

The basic feature of a firewall-based security solution is to do packet by packet inspection using a packet inspection engine. But in today's world where most of the web traffic is encrypted, firewalls must do TLS termination to decrypt the connections so that security policies can be enforced. TLS termination is done through a flow-based engine that requires support of a TCP/IP stack. Therefore, today's firewalls employ both packet inspection engine and flow-based engine to enforce security.

Typical firewall solutions combine functionalities of packet inspection and flow-based engines into a single process with a user space TCP/IP stack. There are several challenges in using a user space TCP/IP stack. One problem is its maintainability. TCP/IP stack is a sophisticated and complex piece of software to which adding, modifying and debugging requires a dedicated team of engineers. The other disadvantage of using a user space TCP/IP stack is, it may not provide a standard socket interface to an application. Therefore, it becomes cumbersome to port existing open-source or third-party applications to run on top of a user space stack making it hard to maintain the application itself.

BRIEF SUMMARY

Some embodiments of the invention provide a novel method for performing firewall operations on a computer. The method of some embodiments instantiates first and second firewall processes on the computer. These two processes are two separate processes, which in some embodiments have separate memory allocations in the memory system of the computer. The method uses the first firewall process to examine a data message to determine whether an encryption based firewall policy (e.g., a TLS-based firewall policy) has to be enforced on the data message. Based on a determination that the encryption-based firewall policy has to be enforced on the data message, the method provides metadata, which is produced by the first firewall process in its examination of the data message, to the second firewall process. The second firewall process then uses the provided metadata to perform an encryption-based firewall operation based on the encryption-based firewall policy. In some embodiments, the data message is encrypted, the first firewall process cannot decrypt the data message, and the second firewall process performs a decryption operation (e.g., a TLS-based decryption operation) to decrypt the data message.

The metadata that the first firewall process provides in some embodiments includes a firewall policy identifier (e.g., a TLS policy identifier) that specifies the firewall policy (e.g., the TLS-based firewall policy) applicable to the data message as identified by the first firewall process. Alternatively, or conjunctively, in some embodiments, the provided metadata includes an action parameter of the firewall policy that the first process identifies as being applicable to the data message.

The first firewall process in some embodiments is a DPDK (Data Plane Development Kit) based packet inspection process, and the first and second processes communicate through DPDK Kernel NIC interface (KNI). Also, in some embodiments, the computer executes a Linux operating system. The method in some of these embodiments provides the metadata from the first firewall process to the second firewall process by providing the data message with the metadata to a kernel of the Linux OS through an eBPF(Extended Berkley Packet Filter) program. In Linux, eBPF is an existent subsystem in Linux kernel that allows general purpose programs to be injected into the kernel. The Linux kernel executes the loaded programs after specific events happen inside the kernel.

Accordingly, when the first firewall process provides the metadata to the kernel, the kernel filter is triggered and in turn calls the associated eBPF program to store the metadata along with a set of header values of the data message in a connection tracker that associates metadata with sets of header values of received data messages for the second firewall process to examine. In some embodiments, the set of header values includes the five-tuple identifier (i.e., source and destination IP addresses, source and destination port addresses, protocol) of the data message. In some embodiments, the first firewall process appends the metadata in an extra header of the data message, and the eBPF program extracts the metadata from this header. The extra header is an encapsulating header in some embodiments, and the eBPF program decapsulates the encapsulating header and extracts the metadata from the decapsulated header.

For some data messages, the first firewall process performs the firewall operation without passing the data messages to the second firewall process. For instance, for a data message, the first firewall process determines a non-encryption based firewall policy to be enforced on data message, and then performs this operation on the data message based on a non-encryption based firewall policy that the first firewall process identifies.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description, and Drawings.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a novel method for performing firewall operations on a computer. The method of some embodiments instantiates first and second firewall processes on the computer. These two processes are two separate processes, which in some embodiments have separate memory allocations in the memory system of the computer. The method uses the first firewall process to examine a data message to determine whether an encryption based firewall policy (e.g., a TLS-based firewall policy) has to be enforced on the data message. Based on a determination that the encryption-based firewall policy has to be enforced on the data message, the method provides metadata, which is produced by the first firewall process in its examination of the data message, to the second firewall process. The second firewall process then uses the provided metadata to perform an encryption-based firewall operation based on the TLS-based firewall policy. In some embodiments, the data message is encrypted, the first firewall process cannot decrypt the data message, and the second firewall process performs a decryption operation (e.g., a TLS-based decryption operation) to decrypt the data message.

The metadata that the first firewall process provides in some embodiments includes a firewall policy identifier (e.g., a TLS policy identifier) that specifies the firewall policy (e.g., the TLS-based firewall policy) applicable to the data message as identified by the first firewall process. Alternatively, or conjunctively, in some embodiments, the provided metadata includes an action parameter of the firewall policy that the first process identifies as being applicable to the data message.

Figure 1:
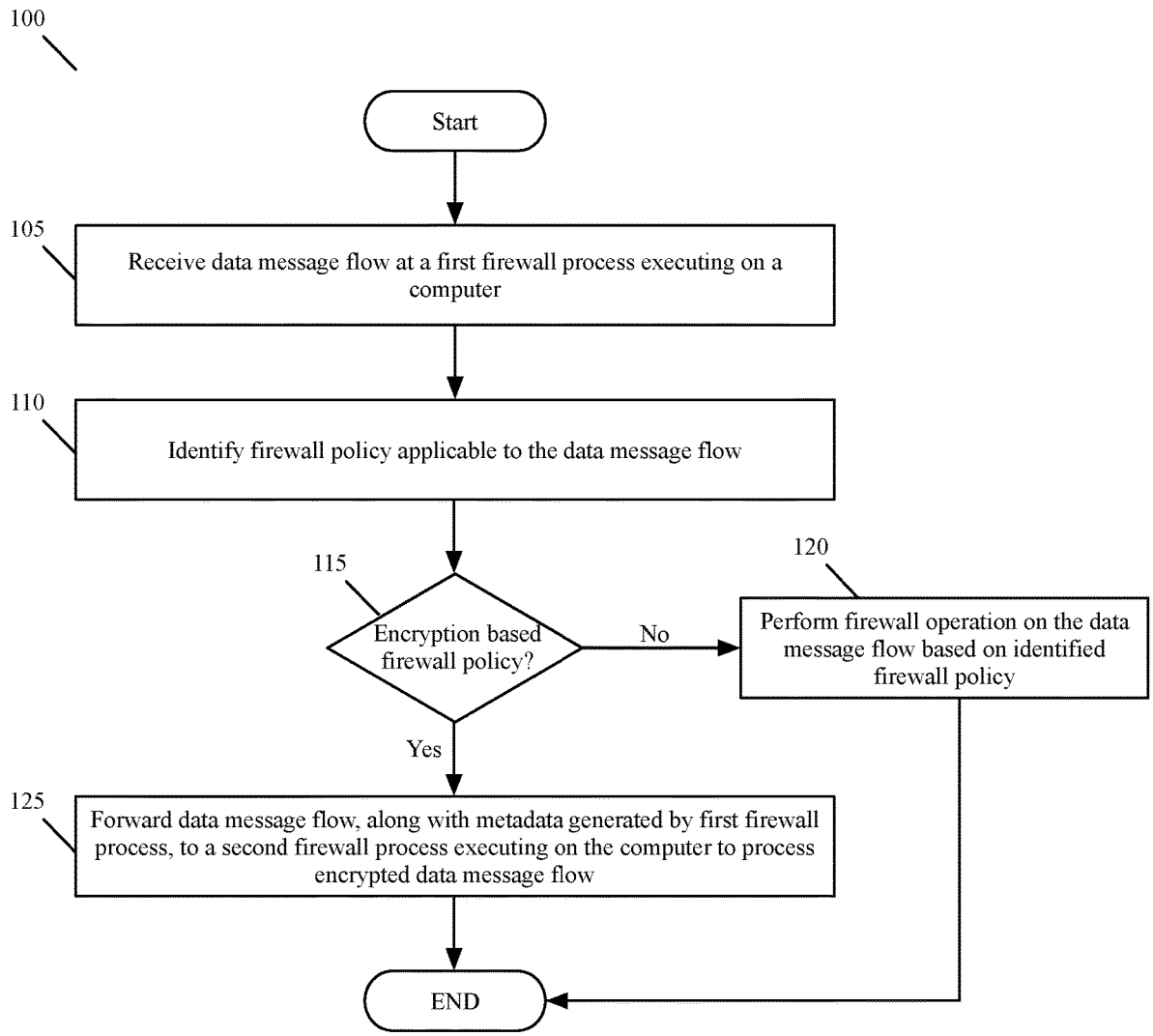
FIG. 1 illustrates a process that performs the method of some embodiments of the invention.
Figure 2:
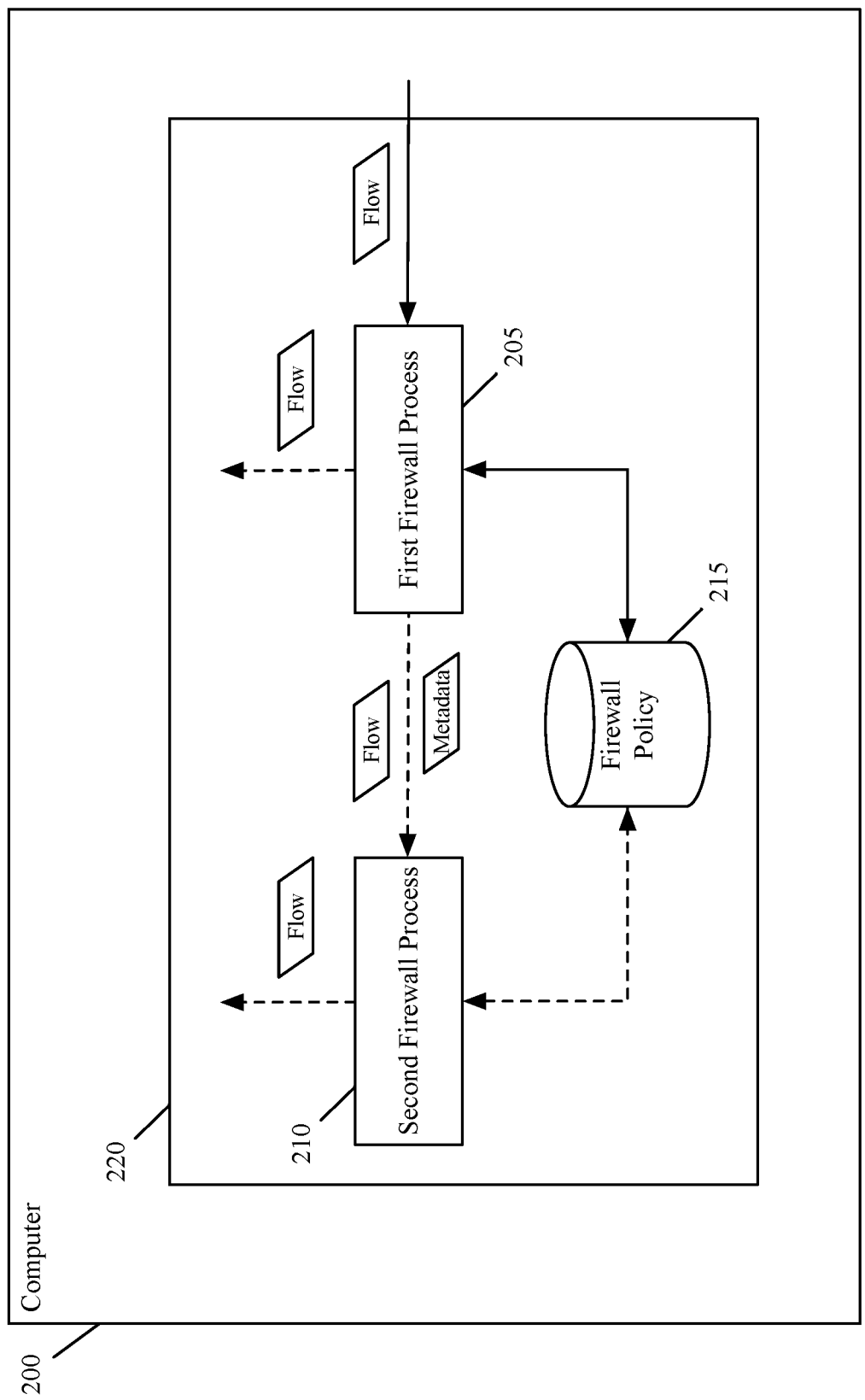
FIG. 2 illustrates these two firewall processes that execute on a computer to perform firewall operations on encrypted and unencrypted data flows.

As used in this document, data messages refer to a collection of bits in a particular format sent across a network. One of ordinary skill in the art will recognize that the term data message is used in this document to refer to various formatted collections of bits that are sent across a network. The formatting of these bits can be specified by standardized protocols or non-standardized protocols. Examples of data messages following standardized protocols include Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer mod FIG. 1 illustrates a process 100 that performs the method of some embodiments of the invention. The process 100 is performed by the first firewall process that executes on a computer along with the second firewall process. FIG. 2 illustrates these two firewall processes 205 and 210 that execute on a computer 200 to perform firewall operations on encrypted and unencrypted data flows. These two processes are two separate processes, which in some embodiments have separate memory allocations in the memory system of the computer. As shown, the two firewall processes 205 and 210 are part of one firewall 220 (e.g., one firewall program or machine) that executes on the computer. In other embodiments, the two firewall processes 205 and 210 are not part of one machine or program, but operate conjunctively to implement one logical firewall.

The first firewall process 205 executes the process 100 for each data message flow that the firewall 220 receives. As such, the process 100 starts when the first firewall process 205 receives (at 105) a first data message of a first data message flow 230. The process 100 then uses a set of attributes of the first data message (e.g., its flow's five tuple identifier) to identify (at 110) a firewall policy in its firewall policy storage 215 that matches the received data message's flow. In some embodiments, each firewall policy has a policy identifier and an action parameter (e.g., specifying allowing or dropping), with the policy identifier specified in terms of the data message header values. In these embodiments, the firewall policy matches the received data message's flow when its policy identifier matches the flow's associated header values (e.g., the flow's five tuple identifier). Also, in some embodiments, the firewall policies are stored in a hierarchical manner in the firewall policy storage 215 to ensure that higher priority policies are examined before lower priority policies.

At 115, the process 100 determines whether the matching firewall policy identified at 110 for the received data message is an encryption based firewall policy (e.g., a TLS-based firewall policy). If not, the process 100 performs (at 120) the firewall operation specified by the action parameter of the identified matching firewall policy and then ends. The action parameter in some embodiments can specify the dropping of the received data message flow (when the action parameter is "drop"), or the forwarding of the received data message flow to its destination (when the action parameter is "allow"). In some embodiments, action data in metadata also includes some data that helps the flow-based engine decrypt the data, e.g., certificate, TLS version, etc.

On the other hand, when the process determines that the matching firewall policy identified at 110 for the received data message is an encryption based firewall policy, the process 100 forwards (at 125) metadata, which the first firewall process 205 produces in its examination of the data message, to the second firewall process 210, and then ends. FIG. 2 illustrates the passing of the received data message flow and the produced metadata from the first firewall process 205 to the second firewall process 210. The second firewall process 210 then uses the provided metadata to perform an encryption-based firewall operation based on the encryption-based firewall policy. In some embodiments, the data message is encrypted, the first firewall process cannot decrypt the data message, and the second firewall process performs the decryption operation to decrypt the data message.

The metadata that the first firewall process provides in some embodiments includes a firewall policy identifier (e.g., a TLS policy identifier) that specifies the firewall policy (e.g., the TLS-based firewall policy) applicable to the data message as identified by the first firewall process. Alternatively, or conjunctively, in some embodiments, the provided metadata includes an action parameter of the firewall policy that the first process identifies as being applicable to the data message. When the metadata includes the firewall policy identifier, the second firewall process 210 uses that identifier to retrieve the firewall policy associated with this identifier from the firewall policy storage 215.

Based on the action parameter of the identified firewall policy, the second firewall process 210 performs the firewall operation on the received data message flow. As mentioned above, the action parameter in some embodiments can specify the dropping of the received data message flow (when the action parameter is "drop"), or the forwarding of the received data message flow to its destination (when the action parameter is "allow").

The forwarding of the data message flow by the first or second firewall processes 205 or 210 are shown with dashed lines, as are the forwarding of the data message flow and the metadata from the first firewall process to the second firewall process, and the policy lookup of the second firewall process 210. The dashed lines are meant to convey the conditional nature of these operations based on assessments performed by the first and second firewall processes 205 and 210 in some embodiments.

The first and second firewall processes in some embodiments are DPDK (Data Plane Development Kit) based processes. For instance, these processes are a first packet inspection engine and a second flow-based engine that communicate through DPDK Kernel NIC interface (KNI). In other embodiments, the packet inspection engine is a DPDK based process while the flow-based engine is an envoy process.

In some embodiments, the computer executes a Linux operating system. The first packet inspection engine in some of these embodiments provides the metadata to the second flow-based engine by providing the data message with the metadata to a kernel of the Linux OS through an eBPF (Extended Berkley Packet Filter) program. In Linux, eBPF is an existent subsystem in Linux kernel that allows general purpose programs to be injected into the kernel. The Linux kernel executes the loaded programs after specific events happen inside the kernel.

Accordingly, when the first firewall process provides the metadata to the kernel, the kernel filter is triggered and in turn calls the associated eBPF program to store the metadata along with a set of header values of the data message in a connection tracker that associates metadata with sets of header values of received data messages for the second firewall process to examine. In some embodiments, the set of header values includes the five-tuple identifier (i.e., source and destination IP addresses, source and destination port addresses, protocol) of the data message. In some embodiments, the first packet-inspection engine appends the metadata in an extra header of the data message, and the eBPF program extracts the metadata from this header. The extra header is an encapsulating header in some embodiments, and the eBPF program decapsulates the encapsulating header and extracts the metadata from the decapsulated header.

Figure 3:
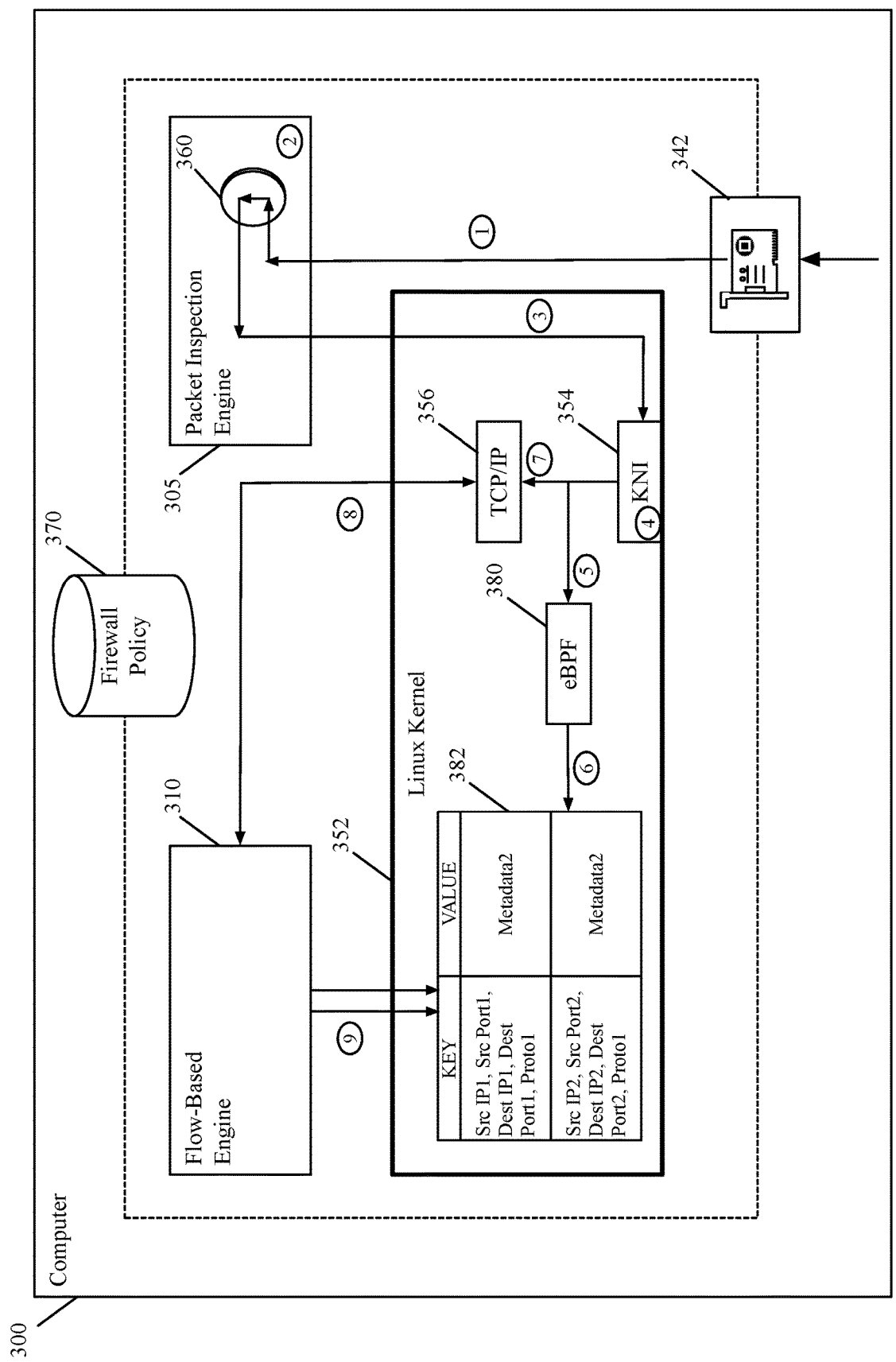
FIG. 3 illustrates an example in which the first and second firewall processes are implemented as a packet-inspection engine and a flow-based engine that execute on a computer with a Linux operating system.

FIG. 3 illustrates an example in which the first and second firewall processes 205 and 210 are implemented as packet-inspection engine 305 and flow-based engine 310 that execute on a computer 300 with a Linux operating system. These engines 305 and 310 are used to perform non-TLS based firewall policies and TLS based firewall policies respectively on packet flows received by the computer. The packet inspection engine 305 is a DPDK based process while the flow-based engine is an envoy process in the example illustrated in FIG. 3. These two processes communicate through the Linux Kernel 352 through its DPDK Kernel NIC interface (KNI) 354 and its TCP/IP stack 356.

Figure 4:
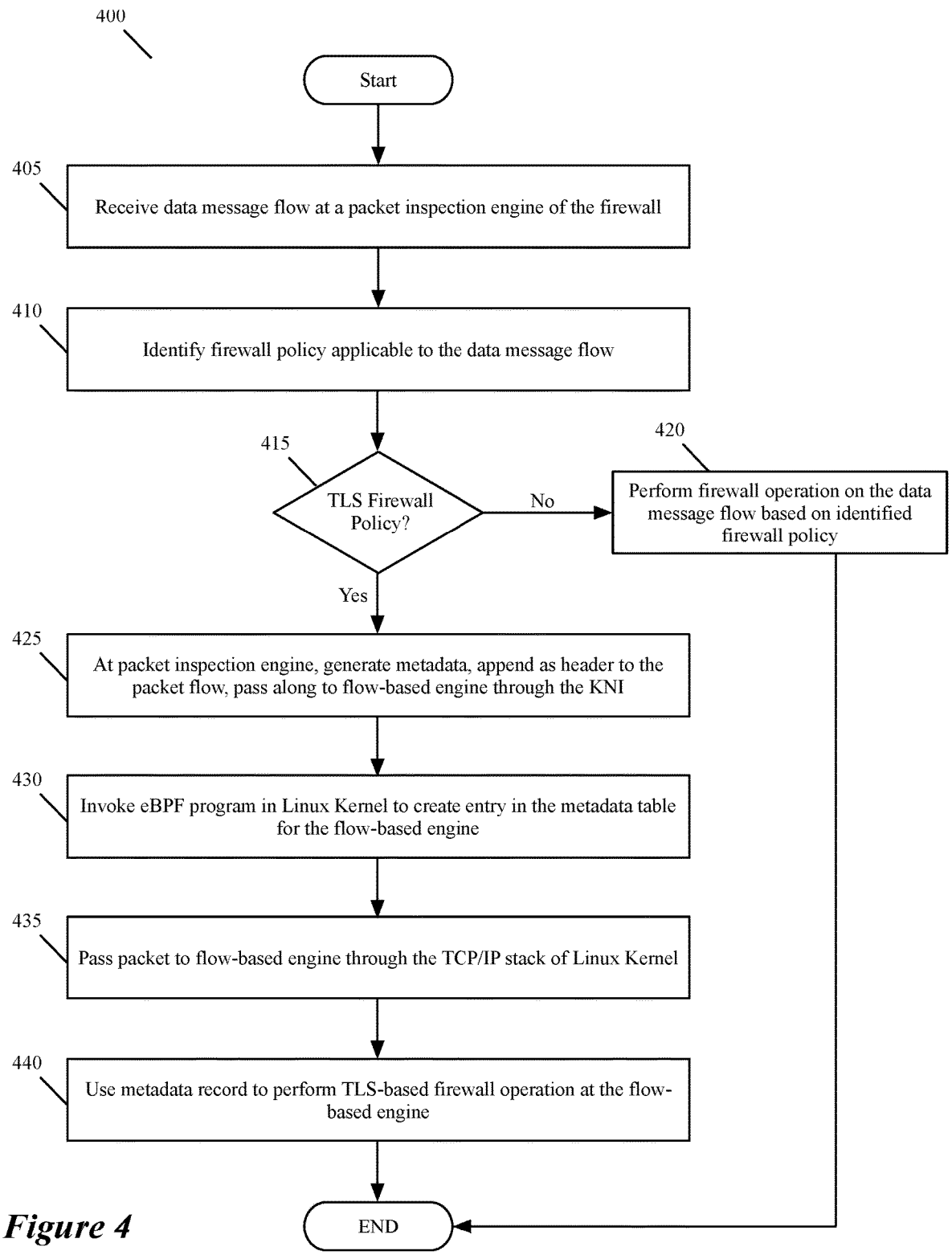
FIG. 4 illustrates a process performed by the two firewall processes of FIG. 3.

The operation of these components is conceptually illustrated by the process 400 of FIG. 4. As shown, the process 400 starts when packets for a data flow are received (at 405) by the packet inspection engine 305 through a NIC (network interface controller) 360 of the computer 300. The packet inspection engine compares (at 410) the header values of the received packets with the policy identifiers of the firewall policies stored in the firewall policy storage 370 to identify a policy that matches the packet.

Next, at 415, the packet inspection engine 305 determines whether the identified policy is a TLS based policy. If not, the packet inspection engine 305 performs (at 420) the firewall operation on the received packet based on the action operation of the identified policy (i.e., drops or forwards the packet based on the action parameter). The process then ends.

On the other hand, when the identified policy is a TLS based policy, the received packet flow needs TLS termination. Accordingly, the packet inspection engine 305 has to pass the packet to the flow-based engine 310. To this end, the packet inspection engine 305 produces (at 425) the metadata for the received packet. Examples of such metadata include the identifier of the firewall policy identified by the packet inspection engine and/or this policy's action parameter in some embodiments. At 425, the packet inspection engine appends this metadata as header (e.g., as an encapsulating header) to the received packets of the received packet flow, and passes the packet to the KNI 354.

The KNI device 342 associated with this interface 354 (at 430) receives the packet received by KNI 354 and invokes an eBPF program 380 that is attached to the ingress of KNI device 342. The eBPF program maintains a hash map in a lookup storage 382. Each entry in this storage has two fields, a key and a value. The key field of an entry is five tuple {Source IP address, Source Port, Destination IP address, Destination Port, Protocol} which is retrieved from packet. The value field stores the metadata stored in the header appended to the packet by the packet inspection engine. When a packet with metadata is processed (at 430) by the attached eBPF program, a new entry is created in the eBPF hash map stored in the lookup storage 382.

After the packet processing is done at eBPF, the KNI device 342 passes (at 435) the packet over to the flow-based engine 310 over the Linux TCP/IP stack 356 and the flow-based engine 310 accepts the connection. This engine then uses (at 440) the received packet's five tuple (i.e., the five tuple of the flow/connection) to retrieve the metadata from eBPF hash map through eBPF system call. It then uses the retrieved metadata to perform its TLS-based firewall operation for the received packet's flow. This operation involves decrypting the received flow when the received flow is encrypted in some cases. In some embodiments, the flow-based engine 310 needs to decrypt the flow in order to retrieve one or more L7 parameters that it uses to evaluate the firewall policy identified by the packet inspection engine and/or perform this policy's associated action. After 440, the process then ends.

It should be noted that there are corner cases of TLS operations where the firewall engine does not need to decrypt the received flow. Also, in some embodiments, there are corner cases where the flow-based engine needs to perform operations on an unencrypted packet flow that matches a TLS policy. In these embodiments, the flow based engine is used to perform TLS based policy enforcement for encrypted and unencrypted flow, as the packet inspection engine 305 cannot perform these operations.

Based on the action parameter of the identified firewall policy, the flow based engine 310 performs the firewall operation on the received data message flow. As mentioned above, the action parameter, in some embodiments, can specify the dropping of the received data message flow (when the action parameter is "drop"), or the forwarding of the received data message flow to its destination (when the action parameter is "allow").

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 5:
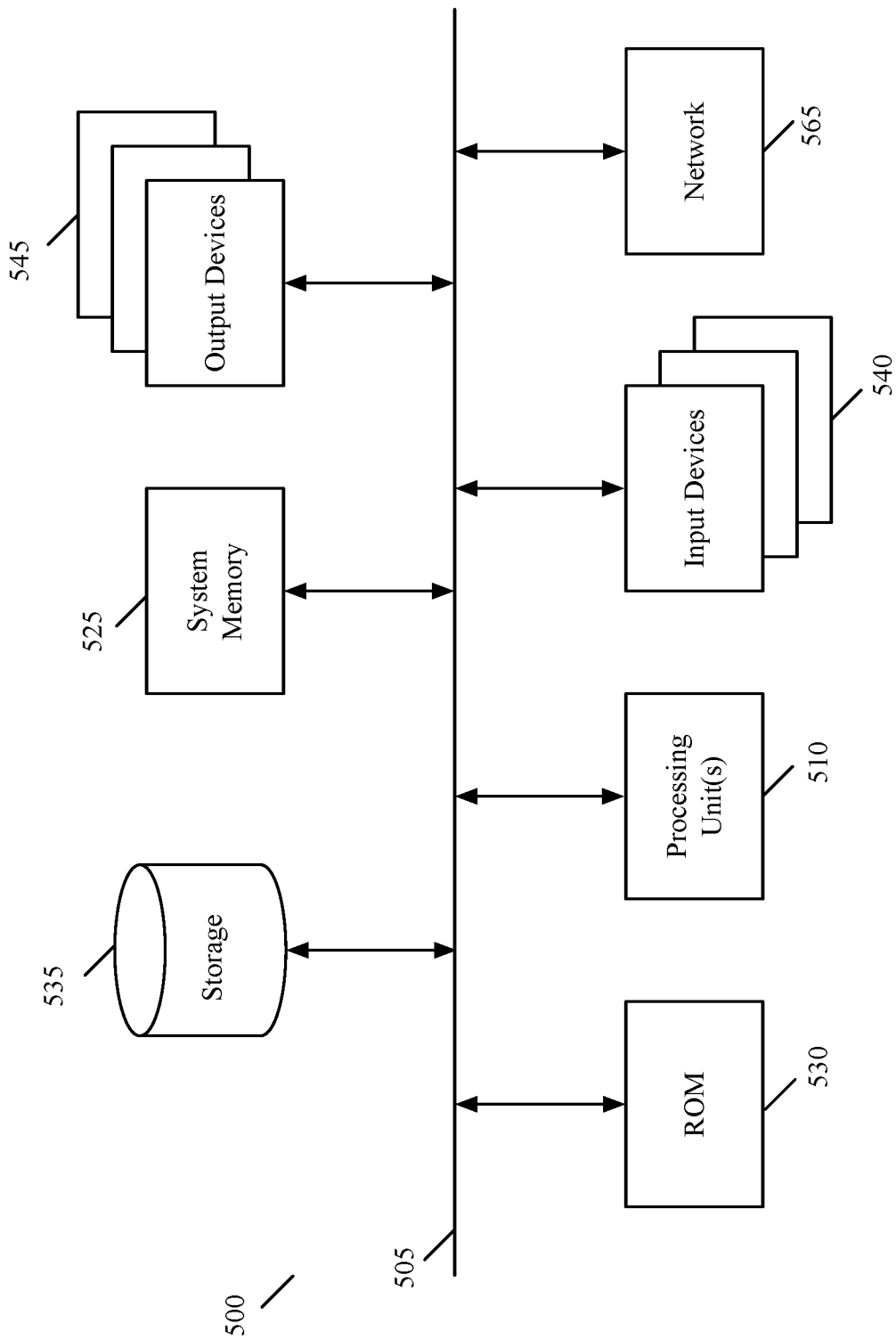
FIG. 5 conceptually illustrates a computer system with which some embodiments of the invention are implemented.

FIG. 5 conceptually illustrates a computer system 500 with which some embodiments of the invention are implemented. The computer system 500 can be used to implement any of the above-described computers and servers. As such, it can be used to execute any of the above described processes. This computer system includes various types of non-transitory machine readable media and interfaces for various other types of machine readable media. Computer system 500 includes a bus 505, processing unit(s) 510, a system memory 525, a read-only memory 530, a permanent storage device 535, input devices 540, and output devices 545.

The bus 505 collectively represents all system, peripheral, and chipset buses that communicatively connect the numerous internal devices of the computer system 500. For instance, the bus 505 communicatively connects the processing unit(s) 510 with the read-only memory 530, the system memory 525, and the permanent storage device 535.

From these various memory units, the processing unit(s) 510 retrieve instructions to execute and data to process in order to execute the processes of the invention. The processing unit(s) may be a single processor or a multi-core processor in different embodiments. The read-only-memory (ROM) 530 stores static data and instructions that are needed by the processing unit(s) 510 and other modules of the computer system. The permanent storage device 535, on the other hand, is a read-and-write memory device. This device is a non-volatile memory unit that stores instructions and data even when the computer system 500 is off. Some embodiments of the invention use a mass-storage device (such as a magnetic or optical disk and its corresponding disk drive) as the permanent storage device 535.

Other embodiments use a removable storage device (such as a flash drive, etc.) as the permanent storage device. Like the permanent storage device 535, the system memory 525 is a read-and-write memory device. However, unlike storage device 535, the system memory is a volatile read-and-write memory, such a random access memory. The system memory stores some of the instructions and data that the processor needs at runtime. In some embodiments, the invention's processes are stored in the system memory 525, the permanent storage device 535, and/or the read-only memory 530. From these various memory units, the processing unit(s) 510 retrieve instructions to execute and data to process in order to execute the processes of some embodiments.

The bus 505 also connects to the input and output devices 540 and 545. The input devices enable the user to communicate information and select commands to the computer system. The input devices 540 include alphanumeric keyboards and pointing devices (also called "cursor control devices"). The output devices 545 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 5, bus 505 also couples computer system 500 to a network 565 through a network adapter (not shown). In this manner, the computer can be a part of a network of computers (such as a local area network ("LAN"), a wide area network ("WAN"), or an Intranet, or a network of networks, such as the Internet. Any or all components of computer system 500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, and any other optical or magnetic media. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method of performing a firewall operation comprising:
instantiating, on a computer, first and second firewall processes that are two separate processes;
using the first firewall process to examine a data message to determine whether a TLS-based firewall policy has to be enforced on the data message;
based on a determination that a TLS-based firewall policy has to be enforced on the data message, providing metadata, produced by the first firewall process in its examination of the data message, to the second firewall process; and
having the second firewall process use the provided metadata to perform a TLS-based firewall operation based on the TLS-based firewall policy;
wherein the computer executes a Linux operating system, and
wherein providing the metadata comprises providing the data message with the metadata to a kernel of the Linux OS,
said providing triggering an eBPF (Extended Berkley Packet Filter) program to store the metadata along with a set of header values of the data message in a connection tracker that associates metadata with sets of header values of received data messages for the second firewall process to examine.

2. The method of claim 1, wherein the data message is encrypted, the first firewall process cannot decrypt the data message, and the second firewall process performs the TLS operation to decrypt the data message.

3. The method of claim 1, wherein the metadata comprises a TLS policy identifier that identifies the TLS-based firewall policy.

4. The method of claim 1, wherein the metadata comprises an action parameter of the TLS-based firewall policy.

5. The method of claim 1, wherein eBPF is an existent subsystem in Linux kernel that let general purpose programs to be injected into the kernel, said kernel executing the loaded programs after specific events happen inside the kernel.

6. The method of claim 1, wherein the set of header values comprises a five-tuple identifier of the data message.

7. The method of claim 1, wherein providing the data message with the metadata comprises encapsulating the metadata in a header of the data message, said eBPF program decapsulating the encapsulating header and extracting the metadata from the decapsulated header.

8. The method of claim 1, wherein the data message is a first data message, the method comprising using the first firewall process (i) to examine a second received data message to determine that a non-TLS based firewall policy has to be enforced on the second data message, and (ii) to perform a firewall operation on the second data message based on the non-TLS based firewall policy.

9. The method of claim 1, wherein the first firewall process is a DPDK (Data Plane Development Kit) based packet inspection process, and the first and second processes communicate through DPDK Kernel NIC interface (KNI).

10. A non-transitory computer readable medium storing a program for performing a firewall operation, the program executable by at least one processing unit, the program comprising sets of instructions for:
instantiating, on a computer, first and second firewall processes that are two separate processes;
using the first firewall process to examine a data message to determine whether a TLS-based firewall policy has to be enforced on the data message;
based on a determination that a TLS-based firewall policy has to be enforced on the data message, providing metadata, produced by the first firewall process in its examination of the data message, to the second firewall process; and
having the second firewall process use the provided metadata to perform a TLS-based firewall operation based on the TLS-based firewall policy;
wherein the computer executes a Linux operating system, and
wherein the set of instructions for providing the metadata comprises a set of instructions for providing the data message with the metadata to a kernel of the Linux OS,
said providing triggering an eBPF (Extended Berkley Packet Filter) program to store the metadata along with a set of header values of the data message in a connection tracker that associates metadata with sets of header values of received data messages for the second firewall process to examine.

11. The non-transitory computer readable medium of claim 10, wherein the data message is encrypted, the first firewall process cannot decrypt the data message, and the second firewall process performs the TLS operation to decrypt the data message.

12. The non-transitory computer readable medium of claim 10, wherein the metadata comprises a TLS policy identifier that identifies the TLS-based firewall policy.

13. The non-transitory computer readable medium of claim 10, wherein the metadata comprises an action parameter of the TLS-based firewall policy.

14. The non-transitory computer readable medium of claim 10, wherein eBPF is an existent subsystem in Linux kernel that let general purpose programs to be injected into the kernel, said kernel executing the loaded programs after specific events happen inside the kernel.

15. The non-transitory computer readable medium of claim 10, wherein the set of header values comprises a five-tuple identifier of the data message.

16. The non-transitory computer readable medium of claim 10, wherein the set of instructions for providing the data message with the metadata comprises sets of instructions for encapsulating the metadata in a header of the data message, said eBPF program comprises sets of instructions for decapsulating the encapsulating header and extracting the metadata from the decapsulated header.

17. The non-transitory computer readable medium of claim 10, wherein the data message is a first data message, the program further comprising a set of instructions for using the first firewall process (i) to examine a second received data message to determine that a non-TLS based firewall policy has to be enforced on the second data message, and (ii) to perform a firewall operation on the second data message based on the non-TLS based firewall policy.

18. The non-transitory computer readable medium of claim 10, wherein the first firewall process is a DPDK (Data Plane Development Kit) based packet inspection process, and the first and second processes communicate through DPDK Kernel NIC interface (KNI).

\* \* \* \* \*